Feb. 28, 1956  H. R. SILLS  2,736,829
DYNAMOELECTRIC MACHINE ROTOR
Filed Sept. 30, 1953
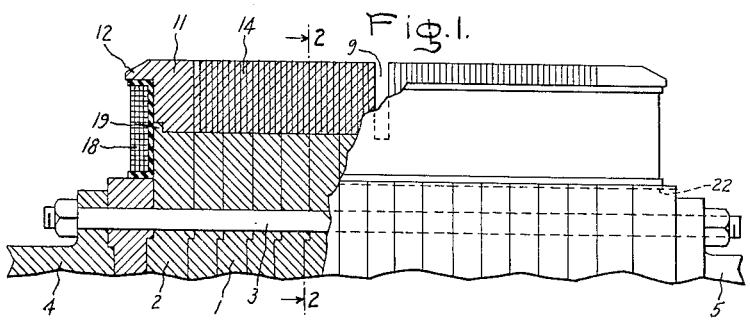
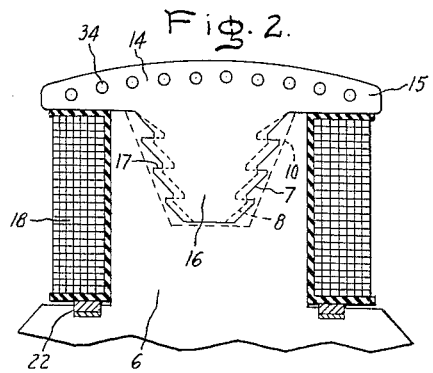
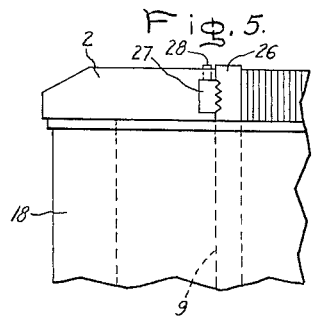
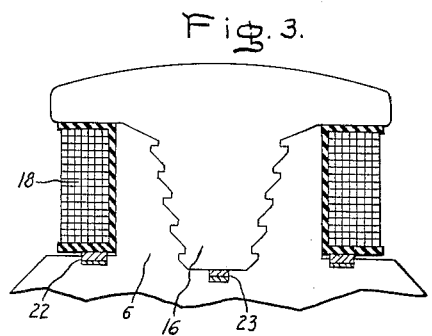
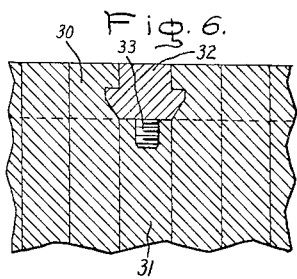
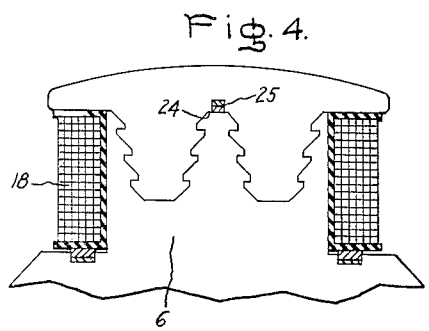
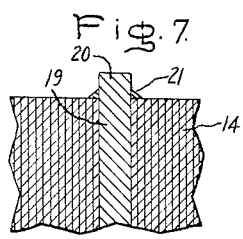
Inventor:
Hubert R. Sills,
by Claude A. Matt.
His Attorney.

United States Patent Office 2,736,829
Patented Feb. 28, 1956

2,736,829

DYNAMOELECTRIC MACHINE ROTOR

Hubert R. Sills, Peterborough, Ontario, Canada, assignor to Canadian General Electric Company, Limited, Toronto, Ontario, Canada, a corporation of Canada Application September 30, 1953, Serial No. 383,219

Claims priority, application Canada October 11, 1952

12 Claims. (Cl. 310—218)

My invention relates to dynamoelectric machines and more particularly to the rotors therefor.

In the construction of rotors for large, high capacity dynamoelectric machines, it is usual to apply a preformed coil to the magnetic material of the pole in such a manner that the coil may be removed for repair or replacement. In the conventional construction, the magnetic body of the pole is built up of laminations having projecting integral tips at their outer ends and provided at their inner ends with an integral suitably shaped T, or dovetail projection. The preformed coil is placed on the body of the pole from the bottom and the completed pole is then driven onto the rotor body endwise with the dovetail engaging a complementary keyway formed therein. The coil is retained in position by the pole tips. In this case the stress borne by the joint due to centrifugal force is caused by the full weight of the pole body and the coil. This construction has proved satisfactory in many applications and has long been used. However, in the case of rotor field magnets for high speed and high capacity dynamoelectric machine, difficulty is encountered in increasing degree as the speed and capacity requirements increase to provide a means for attaching the poles to the body of the rotor which will withstand the severe stress imposed thereon due to centrifugal force.

Another construction which has been used to provide for removing the coil and to reduce the weight carried by the mechanical joint of the conventional construction is to construct the rotor with the magnetic body of the poles integral therewith. The preformed coils are placed on the poles from the top and are held in place by pole shoes bolted to the top of the pole body. This arrangement reduces the weight which has to be carried by the fastening means to that of the pole shoes and the coils, but the advantage thus obtained is materially reduced by the fact that the fastenings so far devised weaken the pole tip structure so that little material advantage is obtained over the conventional construction described.

An object of my invention is to provide a pole design for high speed large capacity generators.

Another object of my invention is to provide a rotor pole construction of great strength to withstand high speed operation.

A further object of my invention is to provide a rotor pole construction of the integral body and removable shoe design characterized by great strength and light weight.

Further objects and advantages of my invention will become apparent and my invention will be better understood from reference to the attached drawing and the following detailed description of a specific embodiment of my invention, and the features of novelty which characterize my invention are set forth in the claims appended hereto and forming part of my specification.

In accordance with one aspect of my invention, I provide a rotor having a pole body integrally secured thereto. A pole shoe is provided having a pair of heavy end plates and a plurality of pole tip laminations therebetween. The end plates and the pole tip laminations have portions which overhang the pole body to secure the winding in place against the action of centrifgal force when the assembled rotor is rotating. To accomplish this, the end plates and the laminations are provided with a pinetree dovetail which engages a complementary shaped keyway formed in the outer end of the pole body. Because this arrangement provides for the wide distribution of the forces holding the pole shoe to the pole body, the assembled rotor can withstand higher speeds of operation.

Fig. 1 is a longitudinal view of the rotor pole construction in accordance with my invention, the left-hand portion being broken away;

Fig. 2 is an enlarged cross-sectional veiw taken along line 2—2 of Fig. 1;

Fig. 3 is a view similar to Fig. 2 of a modified form of my invention;

Fig. 4 is a view similar to Fig. 2 of another modified form of my invention;

Fig. 5 is an enlarged fragmentary view similar to Fig. 1 illustrating a modificaton;

Fig. 6 is an enlarged fragmentary transverse sectional view of a modification of the pole of Fig. 1; and Fig. 7 is an enlarged fragmentary transverse sectional view of the pole of Fig. 1 illustrating a locking arrangement therefor.

Referring to Fig. 1, I have shown a portion of a rotor including one pole. The body of the rotor is shown built up in a known manner from a plurality of steel plates 1, clamped together between end plates 2 by through bolts 3 between flanges on the ends of shafts 4 and 5. The plates 1 and the end plates 2 have peripherally spaced pole projections 6, one only of which is shown in the drawing.

While pole projections 6 may be secured to the plates 1 and 2 in any desired manner, it is preferable that projections 6 be made integral with plates 1 and 2 for maximum strength.

A groove is formed lengthwise in the top of the pole projections 6 parallel to its axis. The profile of the grove formed in the plates 1 is shown by solid lines 7 in Fig. 2. The profile of the groove or keyway formed in the end plates 2 is shown by dotted lines 8 and is similar in contour but is of less width than the groove in plates 1. A narrow transverse slot 9 is formed in the pole midway of its length, the profile of the slot being shown by dash lines 10 in Fig. 2 and the purpose of which will be hereinafter more fully described.

Pole shoe end plates 11 are provided having projecting coil retaining tips 12 at their ends and sides and have projecting from their bottom an interlocking projection shaped to mate with the groove or keyway 8 in the end plates 2. The end plates 2 and pole shoe end plates 11 are preferably of high strength forged steel as they have to withstand a large portion of the stress exerted on the shoe when in operation. Pole punchings 14 are provided with projecting coil retaining tips 15 and have extending from their bottom interlocking projections 16 shaped to mate with the grooves 7 provided in the pole body.

The interlocking joint shown between the pole shoe and the pole body provided by the grooves formed in the end of the pole and the matching projections extending from the bottom of the shoes may be referred to as a "pinetree dovetail" and for convenience will be referred to hereinafter as such. A pinetree dovetail joint is one which has a generally triangular or frustro-triangular outline with the base thereof lying in the direction of the thrust exerted thereon and in which each of the sloping sides is provided with a plurality of interfitting serrations. This construction widely distributes the stresses resulting from centrifugal force throughout the joint and prevents severe localized stress concentrations. In the particular pinetree joint illustrated in Fig. 2, three uniformly spaced serrations are provided on each side. Each serration is provided with a surface 17 which lies substantially normal to the vertical axis of the pole, that is substantially normal to the direction of the stress set up by centrifugal force in rotation of the rotor. The surface 17 may be sloped if desired to counteract the tendency of the pole body to bend at the root of the dovetail under the influence of centrifugal force.

To assemble a pole, the preformed hollow rectangular field coil 18 is placed over the integral pole body. The pole shoe end plates 11 which are, as shown in Fig. 2, provided with a narrower pinetree projection than that of the main body of the punchings 14 are inserted in the wider slot provided for the punchings and pushed towards the end to the position they occupy in Fig. 1 where they mate with the groove provided in the end plates 2. A projection 19 on the end plate 2 engages a cooperating groove formed in the end plate 11 and provides a stop to secure end plate 11 against axial movement. In operation, radial stress exerted due to the weight of the coil and the pole shoes is taken by the pinetree joints. The stress due to the weight of the end of the coil 18 bearing upwardly against the tips 12 of the end plates 11 is in a direction opposing any tendency of the upper end of the end plate to tip outwardly. Pole shoe punchings 14 are provided with projecting tips 15 and have extending from their bottom interlocking projections 16 to mate with the grooves 7 provided in the pole body. The pole punchings 14 are inserted in the slot 9 which, as will be seen from an inspection of Fig. 2, is of sufficient size and shape to permit their pinetree projections 15 to be applied to the mating grooves in the pole body. The punchings are pushed along the grooves from the slot 9 until they bear against the stop provided by the end plates 11. As the pole punchings are thin laminations, they may be inserted at a slight angle anywhere along the length of the pole and twisted into position and the slot 9 resorted to for completing the filling up of the pole to the line of the slot. As the stack of laminations is built up, they may be subjected to pressure from time to time. When the stack is built up to the edges of the slot 9, any suitable filler piece may be applied in the slot to complete the pole. The filler piece used must meet the requirements of being retained in place against the action of centrifugal force and be removable to permit disassembling of the pole for the removal of the coil and preferably made of magnetic material.

In Fig. 7, I have shown a fragmentary sectional view taken along the longitudinal axis of the pole illustrating a suitable filler piece 19. The filler piece 19 is a steel plate of sufficient thickness to fill the slot and with its upper edge projecting above the face of the pole as shown at 20. It is secured in position by welding to adjacent laminations as indicated at 21. To remove the filler piece so that the pole shoe may be disassembled for the removal of the coil, the welded joint is chipped out and a puller piece is welded to the end of the filler piece whereby sufficient force can be exerted to remove it.

Tapered keys 22 are driven under the coil, tightening it against the pole shoe and tightening the joint between the pole shoe and the pole body.

I have shown in Fig. 3 a pinetree joint similar to that in Fig. 2 but differing therefrom in that the pole shoe pinetree projection 16 extends downwardly to the root of the pole body. In this case, as the ends of the pinetree projection extend below the bottom of the coil, wedges 23 may be driven in endwise beneath the coil and between the bottom of the pole tip and the rotor body to tighten the joint therebetween. The pinetree joint illustrated in Fig. 3 has five serrations. Wedges 22 may be provided beneath the coil in the same manner as in Fig. 2.

In Fig. 4 I have shown another modification which is similar to that described in connection with Figs. 1 and 2, except that in this embodiment a pair of similar dovetail joints are provided between the ends of the pole body and the pole shoe. The joint 24 between the bottom of the pole shoe between the pair of dovetails and the top of the pole body lies above the top of the coil 18, and in this case a tightening wedge 25 may be applied at this point. In the construction of Fig. 4 the removable pole tip will be of lesser weight than the construction shown in Fig. 2 and Fig. 3 and in certain cases may be desirable.

In Fig. 5 I have shown a fragment of the left-hand end of the pole shown in Fig. 1 sufficient to illustrate a modification. In this modification the transverse slot 9 instead of being located midway of the length of the pole as shown in Fig. 1, is located immediately adjacent one of the end plates 2. The pole punchings are applied by way of the slot 9 in the same manner as described in connection with Fig. 1 till the pole tip is completed up to the slot. A filler piece 26 is then inserted in the slot and is removably secured in place by a key 27 driven in complementary transverse grooves provided in the end plate 11 and the filler piece 26 above the level of the coil 18. The key 27 may be conveniently anchored in place by a set screw as indicated at 28. In this modification the pole may be disassembled by removing the set screw, driving out the key 27 and pulling the filler piece 26. The inner surfaces of the end plates 11 may be tapered, opening to the tip to permit the use of wedge-shaped filler pieces to facilitate removal thereof. If desired, to further facilitate removal of the filler pieces, passages may be provided for the injection of oil under high pressure.

In the constructions so far described, the pole shoe is described as built up of thin punchings, such as are customarily used in the pole construction, held between end plates of greater thickness and preferably built of forged steel. In some circumstances it may be found desirable for reasons of strength to build up the body of the pole from relatively thick plates instead of the punchings. Such an arrangement is illustrated in Fig. 6. The plates 30 are provided with pinetree dovetail joint projections which assemble with the pole body in the same manner as previously described, by providing a transverse slot wide enough to receive them. The slot is then filled by a filler piece. In the drawing I have shown the filler piece 31 as filling the slot up to the level of the top of the coil. A key 32 adapted to engage with the walls of adjacent plates 30 may be driven in transversely of the pole to hold the filler piece 31 in place. Tapped holes 33 may be provided in the upper edge of the filler piece to facilitate pulling it when the pole is to be disassembled.

If pole face windings are required, as is usually the case, the pole shoe punchings and end plates are provided with appropriate registering holes which are shown at 34 in Fig. 2, and conductors are driven therein after the pole has been assembled. If pole face bars are used, they have to be driven out before the pole can be disassembled as previously described. If pole face bars are used, the filler pieces shown at 19 in Fig. 7, 26 in Fig. 5, and 31 in Fig. 6 may be provided with registering holes through which the pole face conductors pass and which serve to retain them in place, and other filler piece anchoring means described my be dispensed with.

It is apparent that I have provided a pole structure in which the field coil may be conveniently removed, wherein the weight of the removable parts exerting stress on the joint by which they are attached to the rotor body has been minimized, and wherein the stress in the joint is widely distributed in the material forming the pinetree dovetail. It will also be apparent that the construction of my invention provides a detachable pole shoe which holds the field coil in place and this result is attained without weakening the pole shoe. The method of construction permits the provision of a detachable pole shoe with a dovetail joint formed in a channel or groove in the end of the pole body without lengthening the body of the pole over that required for the reception of the field coil.

Moreover, my invention, by distributing the transfer of stress from the pole shoes to the rotor body incrementally by means of a pinetree dovetail, permits proportioning of the pole tip and pole waist to have the strength of conventional pole construction and also permits proportioning of the end plates and their associated rotor parts to secure the same benefits. Thus, higher peripheral speeds and consequent increased capacity, or increased flywheel effect or both may be attained.

My invention may be used to advantage in connection with aluminum conductors in the field coil. Aluminum field coils are lighter than copper coils for the same magnetizing force, but their bulk is greater requiring a longer pole waist to accommodate them. The weight of the additional length of pole waist required does not add to the stresses on the joint in the construction of my invention, whereas in the conventional construction, the additional weight has to be carried by the dovetail at the base of the pole body which more than nullifies the weight-saving in the coil.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. In a salient pole dynamoelectric machine rotor a pole body projecting from said rotor body, a coil surrounding the pole body, and a pole shoe projecting over the coil for restraining the coil from outward movement thereon, means for attaching the pole shoe to the pole body comprising a pinetree dovetail projection extending from the bottom of the pole shoe and means on the end of said pole body forming a complementary groove substantially parallel to the rotor axis providing serrations having surfaces for engaging said pinetree dovetail projection to secure said pole shoe to said pole body.

2. In a salient pole dynamoelectric machine rotor, a pole body projecting from the rotor body, a coil surrounding the pole body and a pole shoe projecting over the coil for restraining the coil from outward movement thereon, said pole shoe comprising a plate of high strength magnetic material at each end having projecting coil retaining tips and a pinetree dovetail projection extending from the bottom thereof, the end of said pole body providing a complementary groove substantially parallel to the rotor axis and having surfaces to engage said pinetree dovetail projection, a plurality of laminations positioned between said end plates provided with coil retaining tips, said laminations having pinetree dovetail projections engaging the coacting surfaces of complementary grooves formed in the pole body substantially parallel to the rotor axis.

3. In a salient pole dynamoelectric machine rotor, a pole body integral with the rotor body, a coil surrounding the pole body and a pole shoe projecting over the coil and restraining the coil from outward movement thereon, said pole shoe comprising a plate of high strength magnetic material at each end thereof, each of said plates having projecting coil retaining tips and a pinetree dovetail projection extending from the bottom thereof engaging the surfaces of a complementary groove formed substantially parallel to the rotor axis in the end of the pole body, a plurality of laminations provided with coil retaining tips positioned between said end plates, said laminations having pinetree dovetail projections for engaging the surfaces of complementary grooves formed in the pole body substantially parallel to the rotor axis, the dovetail joint for securing the end plates being of smaller size than dovetail joint for securing the laminated portion.

4. In a salient pole dynamoelectric machine rotor, a pole body integral with the rotor body, a coil surrounding the pole body and a pole shoe detachably secured to the end of the pole body and projecting over the coil and restraining the coil from outward movement thereon, said pole shoe comprising a plurality of sections provided with projecting coil retaining tips and pinetree dovetail projections extending from the bottoms thereof for engaging the surfaces of a complementary groove formed lengthwise in the end of the pole body, a transverse slot provided in the end of the pole to provide for the insertion of the dovetail projection of a section to engage into the groove whereby the sections may be assembled to the pole body and a filler piece detachably secured in the transverse slot.

5. In a salient pole dynamoelectric machine rotor, a pole body integral with the rotor body, a coil surrounding the pole body and a pole shoe detachably secured to the end of the pole body and projecting over the coil for restraining the coil from outward movement thereon, said pole body having a pinetree dovetail groove cut lengthwise in its end, said pole shoe comprising a plurality of sections each provided with projecting coil retaining tips and provided with complementary pinetree dovetail projections, a slot of greater dimension than the groove cut transversely at the end of the pole body and extending across the groove to provide for the insertion of the sections into assembled position in said groove.

6. In a salient pole dynamoelectric machine rotor, a pole body integral with the rotor body, a coil surrounding the pole body and a pole shoe detachably secured to the end of the pole body and projecting over the coil and restraining the coil from outward movement thereon, said pole having a dovetail groove cut lengthwise in the face thereof, a section of the groove at each end of the pole being of less proportion than the main central portion thereof, pole shoe end plates of high strength magnetic material provided with a dovetail projection complementary to the dovetail grooves in the said end sections and insertable therein by way of the said central portions of the groove, the body of the pole shoe between the said end sections comprising a plurality of laminations of magnetic material with dovetail projections complementary to the groove, a slot cut transversely of the groove in the face of the pole body, said slot being of sufficient width to receive at least one of the laminations and of sufficient proportions to permit the laminations to be assembled therethrough into interlocking relation with the groove to complete the pole shoe from the end plates thereof up to the slot, and a filler piece detachably mounted in the said slot.

7. In a salient pole dynamoelectric machine rotor, a pole body integral with the rotor body, a coil surrounding the pole body and a pole shoe detachably secured to the end of the pole body and projecting over the coil and restraining the coil from outward movement thereon, said pole having a dovetail groove cut lengthwise in the face thereof, a section of the groove at each end of the pole being of smaller dimensions than the main central portion thereof, pole shoe end plates of high strength magnetic material provided with a dovetail projection complementary to the dovetail grooves in the said end sections and insertable therein by way of the said central portions of the groove, the body of the pole shoe between the said end sections comprising a plurality of laminations of magnetic material with dovetail projections complementary to the central portion of the groove, a slot cut transversely of the groove in the face of the pole body, and adjacent one of the end plates, said slot being of sufficient width to receive at least one of the laminations and of sufficient dimensions to permit the laminations to be assembled therethrough into interlocking relation with the groove to complete the pole shoe from the other end plate up to the slot, and a filler piece detachably mounted in the said slot.

8. In a salient pole dynamoelectric machine rotor, a pole body integral with the rotor body, a coil surrounding the pole body and a pole shoe detachably secured to the end of the pole body and projecting over the coil and restraining the coil from outward movement thereon, said pole having a pinetree dovetail groove cut lengthwise in the face thereof, a section of the groove at each end of the pole being of less proportion than the main central portion thereof, pole shoe end plates of high strength magnetic material provided with a pinetree dovetail projection complementary to the dovetail grooves in the said end sections and inserted therein by way of the said central portion of the groove, complementary parts on the pole shoe end plates and the pole body providing a stop for retaining the end plates in position, the body of the pole shoe between the said end sections comprising a plurality of laminations of magnetic material with a pinetree dovetail projection complementary to the central portion of said groove, a slot cut transversely of the groove in the face of the pole body, said slot being of sufficient width to receive at least one of the laminations and of sufficient proportions to permit the laminations to be assembled therethrough into interlocking relation with the groove to complete the pole shoe from the end plates thereof up to the slot, and a filler piece detachably mounted in the said slot.

9. In a salient pole dynamoelectric machine rotor, a pole body integral with the rotor body, a coil surrounding the pole body and a pole shoe detachably secured to the end of the pole body and projecting over the coil and restraining the coil from outward movement thereon, a joint between the pole shoe and the pole body for securing said pole shoe to said pole body comprising a pair of pinetree dovetail projections spaced transversely of the pole and extending from the bottom of the pole shoe and engaging a pair of complementary grooves cut in the end of the pole body, said pair of projections defining a space with the end of said pole body, and a tightening wedge inserted in the said space between pole shoe and the pole body.

10. In a salient pole dynamolelectric machine rotor, a pole body integral with the rotor body, a coil surrounding the pole body and a pole shoe detachably secured to the end of the pole body and projecting over the coil for restraining the coil from outward movement thereon, a joint between the pole shoe and the pole body for securing said pole shoe to said pole body comprising a pinetree dovetail projection extending from the bottom of the shoe and lying lengthwise thereof and engaging a complementary groove cut in the end of the pole body, the bottom of the joint lying below the level of the bottom of the coil, and a tightening wedge inserted at the bottom of the joint.

11. In a salient pole dynamolectric machine rotor, a pole body projecting from the rotor body, a coil surrounding the pole body and a pole shoe having pole tips projecting over the coil for restraining the coil from radially outward movement, a joint between the pole shoe and the pole body for securing said pole shoe to the pole body comprising a dovetail projection extending from the bottom of the shoe and lying lengthwise thereof and interlocked with a complementary groove provided in the outer end of the pole body.

12. In a salient pole dynamolecetric machine rotor, a coil, a pair of pole members comprising a pole body projecting from the rotor body having said positioned coil therearound and a pole shoe having pole tips projecting over the coil for restraining the coil from radially outward movement, a joint between the pole shoe and the pole body for securing said pole shoe to said pole body, said joint comprising a longitudinal groove formed in one of said pole members substantially parallel to the rotor axis and a dovetail projection extending from the other of said pole members interlocked with said longitudinal groove.

No references cited.